United States Patent [19]
Yamazaki et al.

[11] Patent Number: 5,579,742
[45] Date of Patent: Dec. 3, 1996

[54] EVAPORATIVE EMISSION CONTROL SYSTEM FOR INTERNAL COMBUSTION ENGINES

[75] Inventors: Kazumi Yamazaki; Masaaki Horiuchi; Takeaki Nakajima; Koichi Hidano; Takeshi Hara, all of Wako, Japan

[73] Assignee: Honda Giken Kogyo Kabushiki Kaisha, Tokyo, Japan

[21] Appl. No.: 579,356

[22] Filed: Dec. 27, 1995

[30] Foreign Application Priority Data

Dec. 28, 1994 [JP] Japan ..................... 6-338346

[51] Int. Cl.⁶ ............................................. F02M 33/02
[52] U.S. Cl. .................................. 123/520; 123/516
[58] Field of Search ..................... 123/520, 519, 123/516, 518, 198 D, 521; 520/86.1, 86.2

[56] References Cited

U.S. PATENT DOCUMENTS

| | | | |
|---|---|---|---|
| 4,714,172 | 12/1987 | Morris . | |
| 4,762,156 | 8/1988 | Rich . | |
| 5,099,880 | 3/1992 | Szlaga | 123/519 |
| 5,297,528 | 3/1994 | Mukai | 123/520 |
| 5,318,069 | 6/1994 | Harris | 123/519 |
| 5,327,934 | 7/1994 | Thompson | 123/519 |
| 5,359,978 | 11/1994 | Kidokoro | 123/520 |
| 5,404,906 | 4/1995 | Aoshima | 123/519 |
| 5,417,240 | 5/1995 | Benjay | 123/519 |
| 5,456,237 | 10/1995 | Yamazaki | 123/520 |
| 5,456,238 | 10/1985 | Horiuchi | 123/520 |
| 5,462,100 | 10/1995 | Covert et al. . | |
| 5,474,048 | 12/1995 | Yamazaki | 123/519 |
| 5,497,800 | 3/1996 | Ohashi | 123/519 |

*Primary Examiner*—Carl S. Miller
*Attorney, Agent, or Firm*—Nikaido, Marmelstein, Murray & Oram LLP

[57] ABSTRACT

An evaporative emission control system for an internal combustion engine comprises a canister for adsorbing evaporative fuel generated in the fuel tank, and a first evaporative fuel passage extending between the canister and the tank main body of the fuel tank. A differential pressure-operated valve is arranged across the first evaporative fuel passage, which has a positive pressure chamber communicating through the first evaporative fuel passage with the interior of the tank main body of the fuel tank, and a back pressure chamber. The differential pressure-operated valve opens and closes the first evaporative fuel passage in response to a difference in pressure between the positive pressure chamber and the back pressure chamber. A pressure-introducing passage extends between the back pressure chamber and the inlet end portion of a filler pipe extending from the interior of the main body of the fuel tank, and a second evaporative fuel passage extends between the interior of the tank main body of the fuel tank and one of the back pressure chamber and the pressure-introducing passage. A check valve limits the amount of evaporative fuel flowing through the second evaporative fuel passage.

11 Claims, 5 Drawing Sheets

EVAPORATIVE EMISSION CONTROL SYSTEM FOR INTERNAL COMBUSTION ENGINES

BACKGROUND OF THE INVENTION

1. Field of the Invention

This invention relates to an evaporative emission control system for internal combustion engines, which suppresses emission of evaporative fuel generated in the fuel tank of the engine, into the atmosphere during refueling.

2. Prior Art

Figure 1:
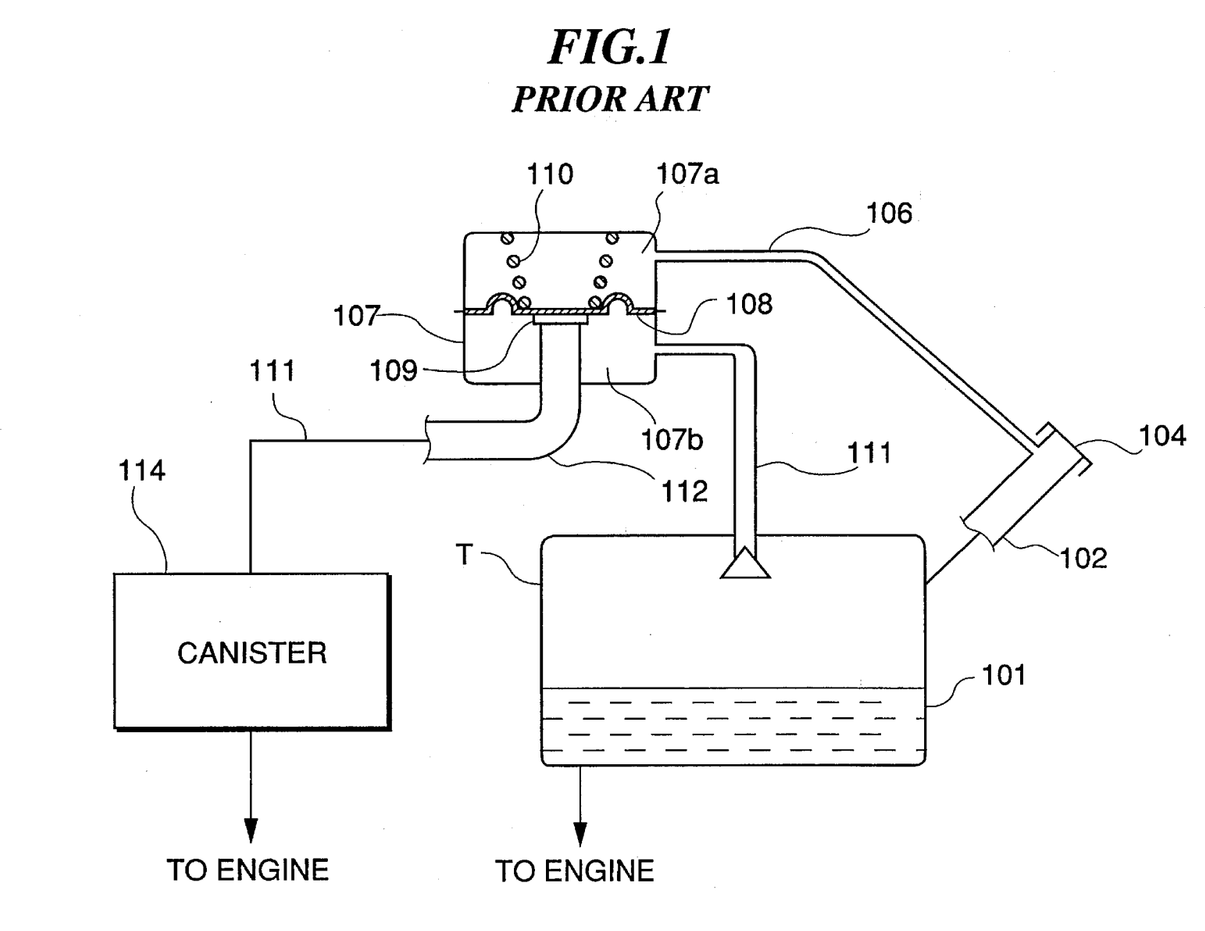
FIG. 1 is a schematic view showing the arrangement of a conventional evaporative emission control system for an internal combustion engine.

An evaporative emission control system of this kind is conventionally known, for example, from U.S. Pat. No. 4,714,172. FIG. 1 shows the arrangement of the evaporative emission control system according to U.S. Pat. No. 4,714,172. As shown in the figure, a fuel tank T is comprised of a tank main body 101, and a filler pipe 102. The evaporative emission control system includes a canister 114 for adsorbing evaporative fuel generated in the tank main body 101, an evaporative fuel passage 111 extending between the tank main body 101 and the canister 114, and a differential pressure-operated valve 107 which is formed by a diaphragm valve and arranged across the evaporative fuel passage 111. The differential pressure-operated valve 107 has a diaphragm 108 partitioning the interior of the valve housing into a back pressure chamber 107a and a positive pressure chamber 107b, a coiled spring 110 arranged within the back pressure chamber 107a, for biasing the diaphragm 108 toward the positive pressure chamber 107b, and a valve element 109 coupled to the diaphragm 108, which is displaceable together with the diaphragm 108 in response to a pressure difference between the two chambers 107a, 107b for opening and closing an opposed open end of an intake passage portion 112 of the evaporative fuel passage 111 on the canister side. A pressure-introducing passage 106 extends between the back pressure chamber 107a and an inlet end portion 104 of the filler pipe 102.

During refueling of the fuel tank T, atmospheric pressure is introduced into the inlet end portion 104 of the filler pipe 102. Due to pouring of fresh fuel into the filler pipe 102, the atmospheric pressure is transmitted through the pressure-introducing passage 106 into the back pressure chamber 107a of the differential pressure-operated valve 107 to open the valve 107, whereby evaporative fuel generated in the tank main body 101 is delivered through the evaporative fuel passage 111 to the canister 114 to thereby prevent evaporative fuel from being emitted into the atmosphere.

However, since during refueling evaporative fuel is generated in large quantities, which is delivered to the canister 114, the canister 114 has to be designed to have a large capacity, which leads to an increased manufacturing cost.

One way to eliminate the above inconvenience is to provide another evaporative fuel passage which extends between the tank main body 101 and the inlet end portion 104 of the filler pipe 102 to return part of evaporative fuel generated in the tank main body 101 to the filler pipe 102.

However, the employment of two evaporative fuel passages necessitates the use of an increased number of passage component parts and complicates the layout and piping, also resulting in an increased manufacturing cost.

SUMMARY OF THE INVENTION

It is the object of the invention to provide an evaporative emission control system for internal combustion engines, which has a reduced number of component parts of passages connecting between the fuel tank and the inlet end portion of the filler pipe, to thereby reduce the manufacturing cost.

According to a first aspect of the invention, there is provided an evaporative emission control system for an internal combustion engine including a fuel tank having a tank main body, and a filler pipe extending from an interior of the tank main body, the filler pipe having an inlet end portion, comprising:

a canister for adsorbing evaporative fuel generated in the fuel tank;

a first evaporative fuel passage extending between the canister and the tank main body of the fuel tank;

a differential pressure-operated valve arranged across the first evaporative fuel passage, the differential pressure-operated valve having a positive pressure chamber communicating through the first evaporative fuel passage with the interior of the tank main body of the fuel tank, and a back pressure chamber, the differential pressure-operated valve being responsive to a difference in pressure between the positive pressure chamber and the back pressure chamber, for opening and closing the first evaporative fuel passage;

a pressure-introducing passage extending between the back pressure chamber and the inlet end portion of the filler pipe;

a second evaporative fuel passage extending between the interior of the tank main body of the fuel tank and one of the back pressure chamber and the pressure-introducing passage; and flow rate-limiting means for limiting an amount of evaporative fuel flowing through the second evaporative fuel passage.

Preferably, the second evaporative fuel passage is smaller in diameter than the pressure-introducing passage.

Also preferably, the flow rate-limiting means comprises a check valve for opening the second evaporative fuel passage when pressure within the second evaporative fuel passage exceeds a predetermined value.

More preferably, the check valve has valve opening pressure thereof set higher than valve opening pressure of the differential pressure-operated valve.

In a preferred embodiment of the invention, the second evaporative fuel passage and the check valve are arranged internally of the differential pressure-operated valve.

According to a second aspect of the invention, the evaporative emission control system is characterized by the improvement comprising:

a housing;

a diaphragm partitioning the housing into a first chamber and a second chamber;

a pressure-detecting port provided in the first chamber and communicated with the inlet end portion of the filler pipe;

an evaporative fuel inlet port provided in the second chamber and communicated with an interior of the tank main body;

an evaporative fuel outlet port provided in the second chamber and communicated with an interior of the canister, the evaporative fuel outlet port having an opening;

a first valve element disposed for displacement together with the diaphragm, for opening and closing the opening of the evaporative fuel outlet port;

a first spring for biasing the first valve element in a direction of closing the opening of the evaporative fuel outlet port;

a communication passage extending between the first chamber and the second chamber, the communication passage having an outlet;

a second valve element arranged at the outlet of the communication passage; and a second spring for biasing the second valve element in a direction of closing the outlet of the communication passage.

According to a third aspect of the invention, the evaporative emission control system is characterized by the improvement comprising:

a housing;

a first diaphragm partitioning the housing into a first chamber and a second chamber;

a second diaphragm partitioning the housing into the second chamber and a third chamber;

a pressure-detecting port provided in the first chamber and communicated with the inlet end portion of the filler pipe;

an evaporative fuel inlet port provided in the second chamber and communicated with an interior of the tank main body;

first and second evaporative fuel outlet ports formed in the second chamber and communicated with an interior of the canister, the first and second evaporative fuel outlet ports having first and second openings, respectively;

an atmospheric pressure port provided in the third chamber and communicated with atmosphere;

a first valve element disposed for displacement together with the first diaphragm, for opening and closing the first opening of the first evaporative fuel outlet port;

a first spring for biasing the first valve element in a direction of closing the first opening of the first valve element;

a second valve element disposed for displacement together with the second diaphragm, for opening and closing the second opening of the second evaporative fuel outlet port;

a second spring for biasing the second valve element in a direction of closing the second opening of the second valve element, the second spring having a biasing force stronger than a biasing force of the first spring;

a communication passage extending between the first chamber and the second chamber, the communication passage having an outlet;

a third valve element arranged at the outlet of the communication passage; and a third spring for biasing the third valve element in a direction of closing the outlet of the communication passage.

Preferably, the evaporative emission control system includes a third evaporative fuel outlet port, a fourth valve element disposed for opening and closing the third evaporative fuel outlet port, and a fourth spring for biasing the fourth valve element in a direction of closing the third evaporative fuel outlet port.

The above and other objects, features, and advantages of the invention will be more apparent from the following detailed description taken in conjunction with the accompanying drawings.

DETAILED DESCRIPTION

The invention will now be described in detail with reference to the drawings showing embodiments thereof.

Figure 2:
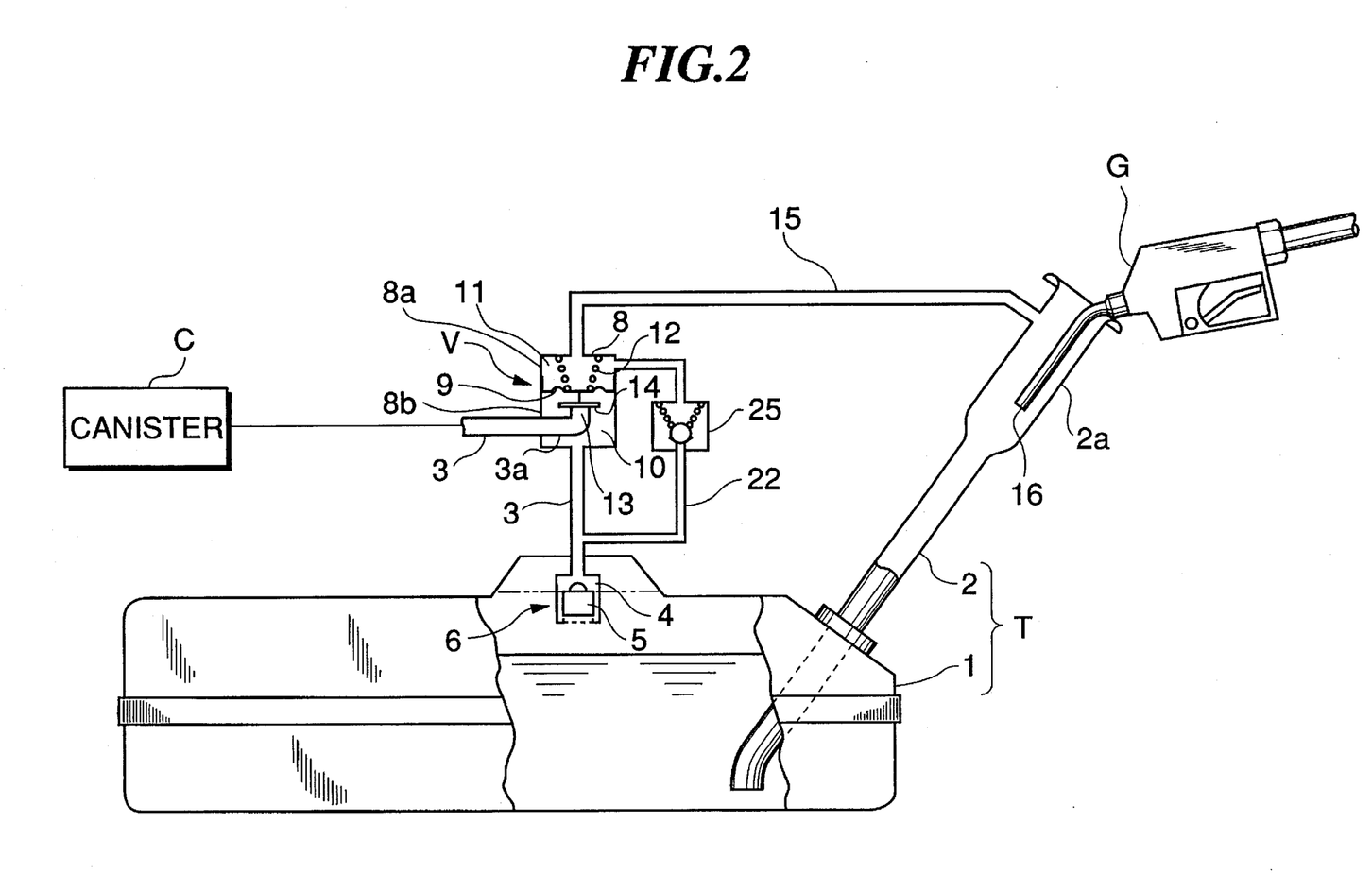
FIG. 2 is a schematic view showing the arrangement of an evaporative emission control system for an internal combustion engine, according to a first embodiment of the invention.

Referring first to FIG. 3, there is illustrated the whole arrangement of an evaporative emission control system for an internal combustion engine, according to a first embodiment of the invention. In the figure, symbol T designates a fuel tank which has a tank main body 1, and a filler pipe 2 upwardly extending from the tank main body 1 in an aslant fashion. The filler pipe 2 has an inlet end portion 2a with an increased diameter at its upper end.

A first evaporative fuel passage 3 has one end thereof connected to an upper or ceiling wall of the tank main body 1 and the other end thereof connected to a canister C for adsorbing evaporative fuel generated in the fuel tank T.

A float valve 6 is provided at the one end of the first evaporative fuel passage 3 connected to the tank main body 1. The float valve 6 is comprised of a float chamber 4, and a float 5. The float valve 6 is disposed to be closed when the surface level of fuel within the tank main body 1 reaches the highest surface level indicated by the two-dot-dash line in FIG. 2. Therefore, the float valve 6 is open before refueling of the fuel tank T is completed.

A differential pressure-operated valve V is arranged across the first evaporative fuel passage 3, which is comprised of a housing 8 formed of upper and lower housing halves 8a and 8b, and a diaphragm 9 with a peripheral edge thereof sandwiched between the upper and lower housing halves 8a and 8b and partitioning the interior of the housing 8 into a positive pressure chamber 10 and a back pressure chamber 11. The positive pressure chamber 10 communicates through the first evaporative fuel passage 3 with the interior of the fuel tank main body 1. A coiled spring 12 is accommodated within the back pressure chamber 11, for biasing the diaphragm 9 toward the positive pressure chamber 10. A pressure-introducing passage 15 is connected to the back pressure chamber 11 and communicates the back pressure chamber 11 with the inlet end portion 2a of the filler pipe 2. On the other hand, a valve element 14 is accommodated within the positive pressure chamber 10, which is coupled to the diaphragm 9 such that the valve element 14 opens and closes an open end 13 of an intake passage portion 3a of the first evaporative fuel passage 3 connected to the canister C, in response to displacement of the diaphragm 9.

When the inlet end portion 2a of the filler pipe 2 is closed by a filler cap, not shown, no pressure difference which displaces the diaphragm 9 and hence the valve element 14 to open the open end 13 is generated between the positive pressure chamber 10 and the back pressure chamber 11, and accordingly the valve V is kept closed. On the other hand, when the inlet end portion 2a is opened to refuel the fuel tank T by inserting a refueling gun G therein, the diaphragm 9 is displaced in such a direction that the volume of the back pressure chamber 11 is reduced according to an increase in pressure within the fuel tank T, i.e. an increase in pressure within the positive pressure chamber 10, and accordingly the valve element 14 is displaced to open the open end 13. Thus, the valve V is kept open during refueling.

Further, a second evaporative fuel passage 22 extends between the first evaporative fuel passage 3 and the back pressure chamber 11 of the valve V, which is smaller in diameter than the pressure-introducing passage 15. The second evaporative fuel passage 22 has a check valve 25 arranged thereacross, which opens when the pressure of evaporative fuel on the side of the tank main body 1 exceeds a predetermined pressure value, to allow evaporative fuel to flow from the tank main body 1 to the inlet end portion 2a of the filler pipe 2. The valve opening pressure of the check valve 25 is set slightly higher than the valve opening pressure of the valve V. If the valve opening pressure of the check valve 25 is not set higher than that of the valve V, the following inconvenience occurs: That is, if the rate of refueling of the fuel tank T is low, the check valve 25 opens when the valve V is still closed, which causes evaporative fuel to be emitted into the atmosphere through the second evaporative fuel passage 22, the back pressure chamber 11, and the pressure-introducing passage 15.

Next, description will be made of the flow of evaporative fuel in the evaporative emission control system according to the present embodiment. When the fuel tank T is being refueled by the refueling gun G, the float valve 6, the differential pressure-operated valve V and the check valve 25 are all open.

Then, part of evaporative fuel generated in the fuel tank T is guided through the first evaporative fuel passage 3 to the canister C, and at the same time another part of the evaporative fuel is guided through the second evaporative fuel passage 22, the back pressure chamber 11, and the pressure-introducing passage 15 to the inlet end portion 2a of the filler pipe 2.

Most of the evaporative fuel which has been guided through the pressure-introducing passage 15 into the inlet end portion 2a of the filler pipe 2 is returned through the filler pipe 2 into the tank main body together with a flow of fuel injected from a nozzle 16 of the refueling gun G. Due to the provision of the check valve 25 arranged across the second evaporative fuel passage 22 and the second evaporative fuel passage 22 smaller in diameter than the pressure-introducing passage 15, the amount of evaporative fuel introduced into the second evaporative fuel passage 22 is limited. As a result, it can be prevented that the pressure within the back pressure chamber 11 of the valve V increases to a value higher than the atmospheric pressure due to evaporative fuel returned through the pressure-introducing passage 15 so that the valve V does not open at refueling. Further, the amount of evaporative fuel emitted from the filler pipe 2 into the atmosphere can be restrained.

As described above, according to the present embodiment, the second evaporative fuel passage 22 is cojoined to the pressure-introducing passage 15 extending between the back pressure chamber 11 of the differential pressure-operated valve V and the inlet end portion 2a of the filler pipe 2, whereby part of evaporative fuel generated in the tank main body 1 is guided through the second evaporative fuel passage 22 and the pressure-introducing passage 15 to the inlet end portion 2a of the filter pipe 2 and then returned to the tank main body 1. By virtue of the above construction, the upper portion of the tank main body 1 and the inlet end portion 2a of the filler pipe 2 can be connected to each other by a single passage whereby the passage arrangement, i.e. the layout and piping can be simplified and the number of the passage component parts can be reduced, resulting in a decrease in the manufacturing cost.

In addition, in the illustrated embodiment, a lower open end of the filler pipe 2 is located near the bottom surface of the tank main body 1, to thereby prevent part of evaporative fuel generated in the tank main body 1 from being guided through the filler pipe 2 and emitted into the atmosphere.

Figure 3:
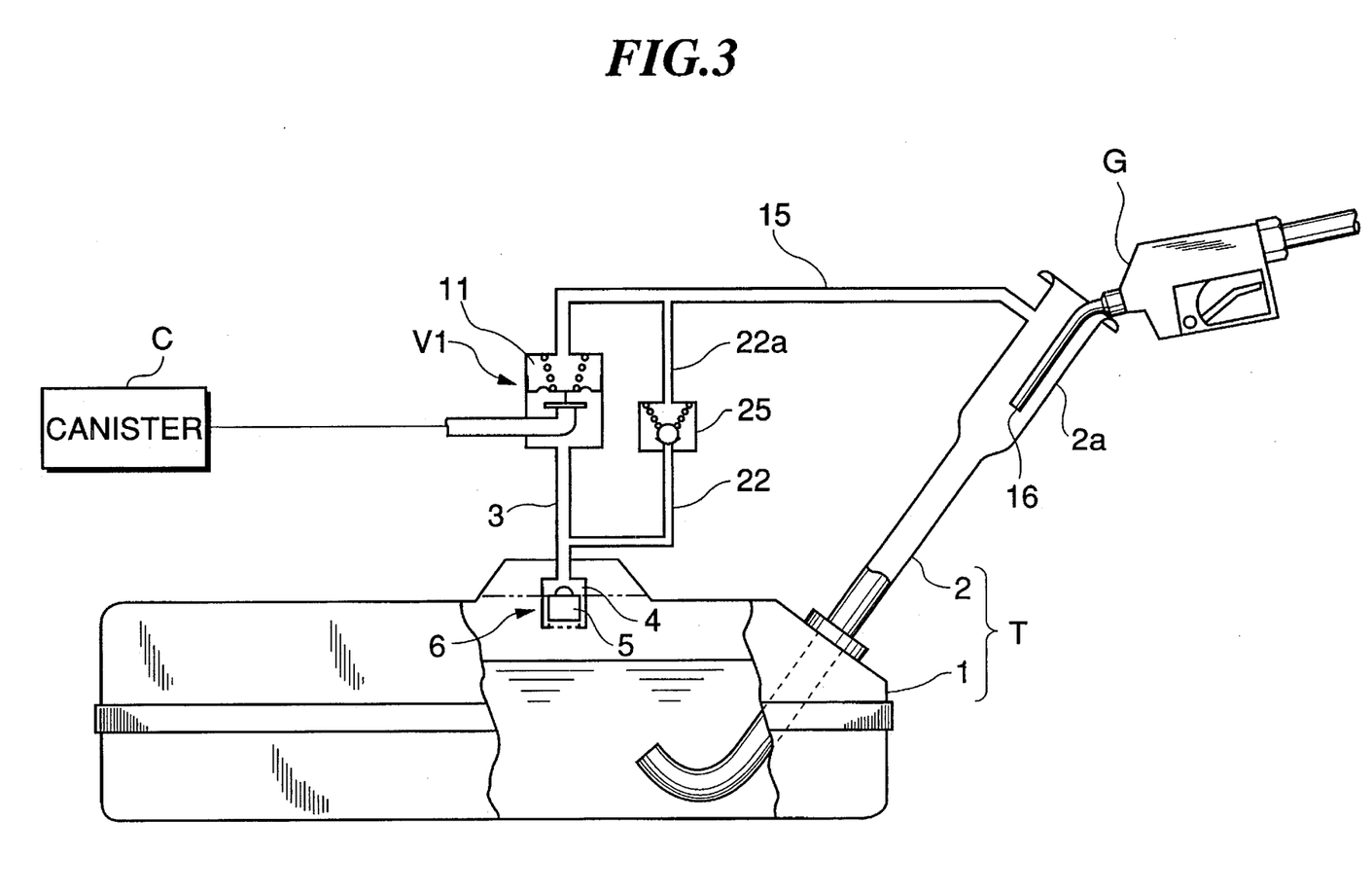
FIG. 3 is a schematic view showing the arrangement of an evaporative emission control system according to a second embodiment of the invention.

Next, description will be made of a second embodiment of the invention. FIG. 3 shows the arrangement of the evaporative emission control system according to the second embodiment. Elements and parts of the second embodiment, which correspond to those of the first embodiment, are designated by identical reference numerals and symbols, description thereof being omitted.

According to the second embodiment, the second evaporative fuel passage 22 has a passage portion 22a which extends from the outlet side of the check valve 25 and is connected at an end thereof to an intermediate portion of the pressure-introducing passage 15, instead of being connected to the back pressure chamber of the differential pressure-operated valve V. The second evaporative fuel passage 22 including the passage portion 22a is smaller in diameter than the pressure-introducing passage 15, similarly to the first embodiment.

With this arrangement as well, effects similar to those of the first embodiment mentioned hereinbefore can be obtained, and moreover the construction of the valve V1 can be simplified.

Figure 4:
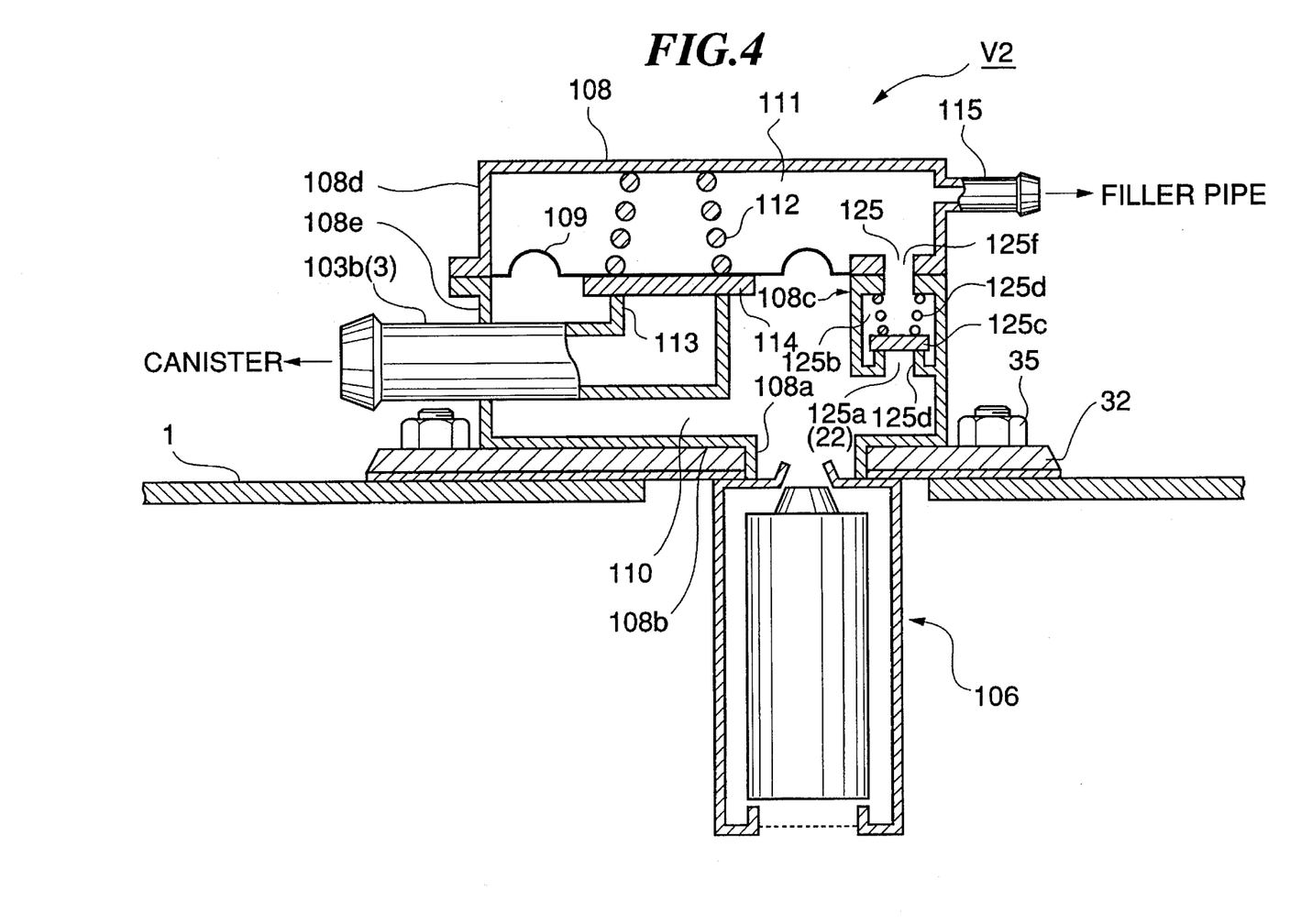
FIG. 4 is a fragmentary sectional view of the interior construction of a differential pressure-operated valve employed in an evaporative emission control system according to a third embodiment of the invention.

Next, description will be made of a third embodiment of the invention. FIG. 4 shows the interior construction of a differential pressure-operated valve V2 employed in the evaporative emission control system according to the third embodiment.

The differential pressure-operated valve V2 is directly mounted on an upper or ceiling wall of the tank main body 1 via a gasket 32 by means of bolts 35. The valve V2 has a housing 108 which has a bottom wall 108b facing the tank main body 1, through which an opening 108a is formed as part of the first evaporative fuel passage 3, in a fashion opposed to a floating chamber 106.

The valve V2 of the present embodiment has a check valve 125 incorporated inside thereof, which has a function similar to the check valve 25 employed in the first and second embodiments. The check valve 125 is formed in a partition wall portion 108c in a fashion defining a positive pressure chamber 110 and a back pressure chamber 111.

More specifically, the positive pressure chamber 110 and the back pressure chamber 111 are defined by a diaphragm 109 with a peripheral edge thereof sandwiched between upper and lower halves 108d and 108e of the housing 108 as well as by the check valve 125. The back pressure chamber 111 has a coiled spring 112 accommodated therein, for biasing the diaphragm 109 toward the positive pressure chamber 110, exactly, toward an intake passage portion 103b of the first evaporative fuel passage 3 accommodated within the positive pressure chamber 110 of the valve V2. A valve element 114 is also accommodated within the positive pressure chamber 110 and connected to the diaphragm 109, for opening and closing an open end 113 of the intake passage portion 103b. The check valve 125 has a valve hole 125a formed in a wall of the partition wall portion 108c within the positive pressure chamber 110. A spring chamber 125b is formed within the partition wall portion 108c at a location closer to the back pressure chamber 111 than the valve hole 125a, and in which are accommodated a valve element 125c and a coiled spring 125d for biasing the valve element 125c toward the valve hole 12a to open and close the same. A communication port 125f is formed through a wall of the partition wall portion 108c closer to the back pressure chamber 111 and communicate between the spring chamber 125b and the back pressure chamber 111. A pressure-introducing passage 115 leading to the inlet end portion 2a of the filler pipe 2, not shown in FIG. 4, is connected to an upper wall portion of the housing 108. The valve hole 125a also forms part of the second evaporative fuel passage 22 together with the communication port 125f and may be smaller in diameter than the pressure-introducing passage 115.

In the differential pressure-operated valve V2 constructed as above, the valve opening pressure of the check valve 125 is set higher than that of the valve 2. When the pressure of evaporative fuel generated in the tank main body 1 exceeds a predetermined pressure value during refueling, the check valve 125 opens to allow evaporative fuel to flow from the tank main body 1 to the inlet end portion 2a of the filler pipe 2.

According to the third embodiment, the check valve 125 and the second evaporative fuel passage 22 are incorporated integrally within the interior of the differential pressure-operated valve V2. As a result, not only effects similar to those of the first embodiment mentioned hereinbefore can be obtained, but also the passage arrangement can be further simplified than in the first embodiment.

Figure 5:
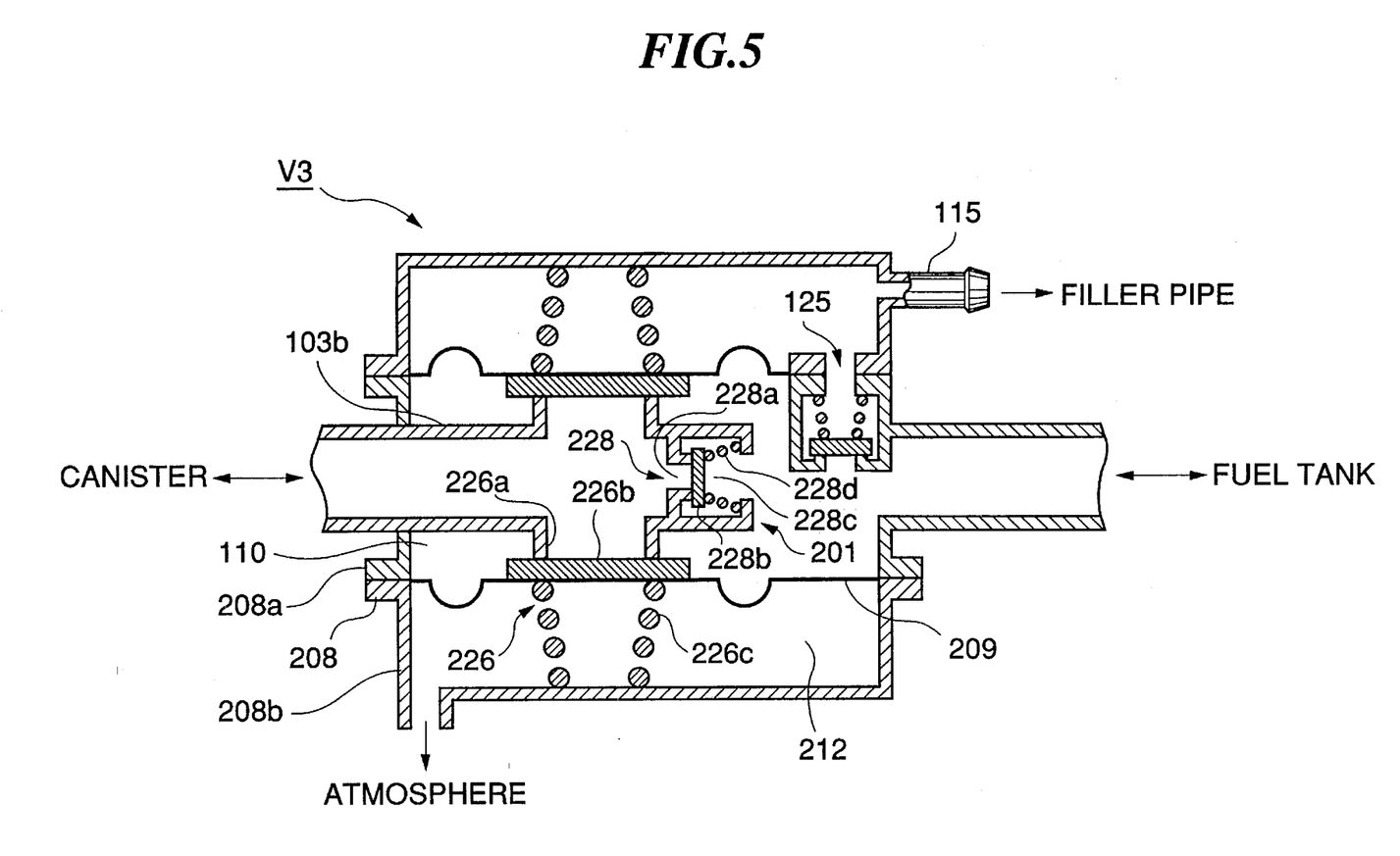
FIG. 5 is a fragmentary sectional view of the interior construction of a differential pressure-operated valve employed in an evaporative emission control system according to a fourth embodiment of the invention.

Next, description will be made of a fourth embodiment of the invention. FIG. 5 shows the interior construction of a differential pressure-operated valve V3 employed in the fourth embodiment.

The differential pressure-operated valve V3 of the present embodiment is characterized in that a two-way valve 201 is incorporated within the valve V3 at an intake passage portion 103b of the first evaporative fuel passage 3. The constructions of the differential pressure-operated valve V3 and the check valve 225 are identical with those of the differential pressure-operated valve V2 and the check valve 125 in the third embodiment, and therefore the construction of the two-way valve 201 alone will be described hereinbelow, while elements and parts corresponding to those of the third embodiment are designated by identical reference numerals, description thereof being omitted.

A positive pressure chamber 110 in which an intake passage portion 103b of the first evaporative fuel passage 3 is provided is defined by a diaphragm 209 with its peripheral edge sandwiched between component parts 208a and 208b of a housing 208 and partitioned from an atmospheric pressure chamber 212 which opens into the atmosphere. The two-way valve 201 is formed by a positive pressure valve 226 and a negative pressure valve 228, which are disposed to open and close the intake passage portion 203b.

More specifically, the positive pressure valve 226 is comprised of a valve hole 226a formed in a wall of the intake passage portion 103b, a valve element 226b coupled to the diaphragm 209 for opening and closing the valve hole 226a, and a coiled spring 226c for biasing the diaphragm 209 toward the positive pressure chamber 110.

The negative pressure valve 228 is provided at an open end of the intake passage portion 103b on the fuel tank T side, and comprised of a valve hole 228a formed inside a peripheral wall of the intake passage portion 103b, a valve element 228b accommodated in a spring chamber 228c opening into the positive pressure chamber 110, and a coiled spring 228c also accommodated in a spring chamber 228c, for biasing the valve element 228b toward the valve hole 228a.

At refueling, the positive pressure valve 226, the differential pressure-operated valve V3 and the check valve 225 are all open. The valve opening pressure of the check valve 225 is set higher than that of the valve V3, so that it can be prevented that the check valve 225 unfavorably opens with the valve V3 being still closed if the rate of refueling of the fuel tank T is low to allow evaporative fuel to be guided through the pressure-introducing passage 115 and emitted into the atmosphere. If the pressure within the fuel tank exceeds the atmospheric pressure by a predetermined pressure value or more on an occasion other than refueling, the positive pressure valve 226 opens, and then evaporative fuel flows into the intake passage portion 103b and through the first evaporative fuel passage 3 to be adsorbed by the canister, whereby the pressure within the fuel tank can be prevented from increasing.

The negative pressure valve 228 opens when the pressure within the fuel tank becomes lower than the pressure within the canister by a predetermined pressure value or more, and then evaporative fuel generated in the canister is returned through the first evaporative fuel passage 3 and then the intake passage portion 103b into the fuel tank.

As described above, according to the fourth embodiment, effects similar to the third embodiment mentioned hereinbefore can be obtained. Besides, since the two-way valve 201 which does not only open the intake passage portion 103 at refueling but also opens and closes the same on occasions other than refueling is incorporated within the differential pressure-operated valve V3 in one body, the passage configuration between the canister and the fuel tank can be simplified.

What is claimed is:

1. An evaporative emission control system for an internal combustion engine including a fuel tank having a tank main body, and a filler pipe extending from said tank main body, said filler pipe having an inlet end portion, comprising:

a canister for adsorbing evaporative fuel generated in said fuel tank;

a first evaporative fuel passage extending between said canister and said tank main body of said fuel tank;

a differential pressure-operated valve arranged across said first evaporative fuel passage, said differential pressure-operated valve having a positive pressure chamber communicating through said first evaporative fuel passage with an interior of said tank main body of said fuel tank, and a back pressure chamber, said differential pressure-operated valve being responsive to a difference in pressure between said positive pressure chamber and said back pressure chamber, for opening and closing said first evaporative fuel passage;

a pressure-introducing passage extending between said back pressure chamber and said inlet end portion of said filler pipe;

a second evaporative fuel passage extending between the interior of said tank main body of said fuel tank and one of said back pressure chamber and said pressure-introducing passage; and flow rate-limiting means for limiting an amount of evaporative fuel flowing through said second evaporative fuel passage.

2. An evaporative emission control system as claimed in claim 1, wherein said second evaporative fuel passage is smaller in diameter than said pressure-introducing passage.

3. An evaporative emission control system as claimed in claim 1, wherein said flow rate-limiting means comprises a check valve for opening said second evaporative fuel passage when pressure within said second evaporative fuel passage exceeds a predetermined value.

4. An evaporative emission control system as claimed in claim 2, wherein said flow rate-limiting means comprises a check valve for opening said second evaporative fuel passage when pressure within said second evaporative fuel passage exceeds a predetermined value.

5. An evaporative emission control system as claimed in claim 3, wherein said check valve has valve opening pressure thereof set higher than valve opening pressure of said differential pressure-operated valve.

6. An evaporative emission control system as claimed in claim 4, wherein said check valve has valve opening pressure thereof set higher than valve opening pressure of said differential pressure-operated valve.

7. An evaporative emission control system as claimed in claim 3, wherein said second evaporative fuel passage and said check valve are arranged internally of said differential pressure-operated valve.

8. An evaporative emission control system as claimed in claim 4, wherein said second evaporative fuel passage and said check valve are arranged internally of said differential pressure-operated valve.

9. In an evaporative emission control system for an internal combustion engine including a fuel tank having a tank main body, and a filler pipe extending from said tank main body, said filler pipe having an inlet end portion, said evaporative emission control system including a canister for adsorbing evaporative fuel generated in said fuel tank, and an evaporative fuel passage extending between said canister and said fuel tank, the improvement comprising:

a housing;

a diaphragm partitioning said housing into a first chamber and a second chamber;

a pressure-detecting port provided in said first chamber and communicated with said inlet end portion of said filler pipe;

an evaporative fuel inlet port provided in said second chamber and communicated with an interior of said tank main body;

an evaporative fuel outlet port provided in said second chamber and communicated with an interior of said canister, said evaporative fuel outlet port having an opening;

a first valve element disposed for displacement together with said diaphragm, for opening and closing said opening of said evaporative fuel outlet port;

a first spring for biasing said first valve element in a direction of closing said opening of said evaporative fuel outlet port;

a communication passage extending between said first chamber and said second chamber, said communication passage having an outlet;

a second valve element arranged at said outlet of said communication passage; and a second spring for biasing said second valve element in a direction of closing said outlet of said communication passage.

10. In an evaporative emission control system for an internal combustion engine including a fuel tank having a tank main body, and a filler pipe extending from said tank main body, said filler pipe having an inlet end portion, said evaporative emission control system including a canister for adsorbing evaporative fuel generated in said fuel tank, and an evaporative fuel passage extending between said canister and said fuel tank, the improvement comprising:

a housing;

a first diaphragm partitioning said housing into a first chamber and a second chamber;

a second diaphragm partitioning said housing into said second chamber and a third chamber;

a pressure-detecting port provided in said first chamber and communicated with said inlet end portion of said filler pipe;

an evaporative fuel inlet port provided in said second chamber and communicated with an interior of said tank main body;

first and second evaporative fuel outlet ports formed in said second chamber and communicated with an interior of said canister, said first and second evaporative fuel outlet ports having first and second openings, respectively;

an atmospheric pressure port provided in said third chamber and communicated with atmosphere;

a first valve element disposed for displacement together with said first diaphragm, for opening and closing said first opening of said first evaporative fuel outlet port;

a first spring for biasing said first valve element in a direction of closing said first opening of said first valve element;

a second valve element disposed for displacement together with said second diaphragm, for opening and closing said second opening of said second evaporative fuel outlet port;

a second spring for biasing said second valve element in a direction of closing said second opening of said second valve element, said second spring having a biasing force stronger than a biasing force of said first spring;

a communication passage extending between said first chamber and said second chamber, said communication passage having an outlet;

a third valve element arranged at said outlet of said communication passage; and a third spring for biasing said third valve element in a direction of closing said outlet of said communication passage.

11. An evaporative emission control system as claimed in claim 10, further including a third evaporative fuel outlet port, a fourth valve element disposed for opening and closing said third evaporative fuel outlet port, and a fourth spring for biasing said fourth valve element in a direction of closing said third evaporative fuel outlet port.

* * * * *